United States Patent [19]

Harrison

[11] Patent Number: 4,463,969
[45] Date of Patent: Aug. 7, 1984

[54] HIGH PRESSURE HYDRAULIC SYSTEMS

[75] Inventor: Anthony W. Harrison, Birmingham, England

[73] Assignee: Lucas Industries Limited, Birmingham, England

[21] Appl. No.: 441,776

[22] Filed: Nov. 15, 1982

Related U.S. Application Data

[63] Continuation of Ser. No. 130,720, Mar. 17, 1980, abandoned.

[30] Foreign Application Priority Data

Mar. 16, 1979 [GB] United Kingdom ............... 7909297

[51] Int. Cl.³ .............................................. B60G 11/26
[52] U.S. Cl. ..................................... 280/707; 137/613; 251/141; 280/DIG. 1
[58] Field of Search ............... 137/613; 251/121, 141; 280/707, DIG. 1; 267/64.16, 64.17, 64.18, 64.19, 64.21

[56] References Cited

U.S. PATENT DOCUMENTS

| | | | |
|---|---|---|---|
| 2,366,006 | 12/1944 | Culver | 251/141 X |
| 2,560,293 | 7/1951 | Kempton | 251/141 X |
| 2,587,356 | 2/1952 | McPherson | 137/613 |
| 2,631,612 | 3/1953 | Buescher | 251/141 X |
| 2,891,577 | 6/1959 | Stewart, Jr. | 137/613 X |
| 2,929,640 | 3/1960 | Faiver | 280/707 |
| 3,140,727 | 7/1964 | Cutler | 251/141 X |
| 3,537,355 | 11/1970 | Bliss | 251/141 X |
| 3,866,895 | 2/1975 | Schultz | 267/64.16 |
| 4,044,794 | 8/1977 | Matthews | 132/613 |
| 4,150,684 | 4/1979 | Kervin | 132/613 X |
| 4,270,771 | 6/1981 | Fujii | 267/64.19 |

FOREIGN PATENT DOCUMENTS

| | | | |
|---|---|---|---|
| 202778 | 2/1955 | Australia | 267/DIG. 1 |
| 21824 | of 1914 | United Kingdom | 251/141 |
| 882493 | 11/1961 | United Kingdom | 137/613 |

Primary Examiner—George E. A. Halvosa
Attorney, Agent, or Firm—Scrivener, Clarke, Scrivener and Johnson

[57] ABSTRACT

In a high pressure hydraulic system a source supplies pressurized fluid to a slave unit through a control valve operative to maintain the slave unit in a desired condition. Leakage from the slave unit past the control valve when the source is inoperative is undesirable, but it is difficult to provide durable leakproof seals and to minimize valve operating forces at high fluid pressures. The control valve therefore comprises two solenoid-operated valves oppositely acting and arranged in series between the source and the slave unit, each valve being closed to prevent flow through the valve in a direction from the other valve and opened to permit flow in both directions, under the control of a solenoid and the pressure differential acting across the valve, a seating portion on a first valve is of elastomeric material to provide a leakproof seal when that valve is closed. In the construction shown the slave unit is an hydraulic suspension strut, and the system is adapted as a vehicular suspension levelling system, with the valves and the source being manipulated as required by an electronic control system.

13 Claims, 4 Drawing Figures

HIGH PRESSURE HYDRAULIC SYSTEMS

This application is a continuation of application Ser. No. 130,720, filed Mar. 17, 1980, now abandoned.

This invention relates to high pressure hydraulic systems of the kind in which a slave unit, for example an hydraulic suspension strut of a vehicle hydraulic suspension system, is supplied with fluid under pressure from a source through a control valve assembly which is operative to maintain the slave unit in a desired condition.

In hydraulic systems of the kind set forth leakage past a control valve when the source is inoperative is undesirable since this can cause the system to "settle" and thus change or reduce the effect of the slave unit on parts with which it is associated. In particular, when the slave unit is an hydraulic suspension strut connected between sprung and unsprung parts, leakage past the conrol valve with the source inoperative can change the proper attitude of the vehicle and may, eventually, cause the suspension to "bottom" against the bump stops.

Substantially zero leakage control for suspension systems of the kind set forth can be achieved by the use of elastomeric seals. In such a case, when a valve opens against a pressure differential, a position is reached where the seal is still operating but the extrusion gap is quite large. The seal must resist extrusion if it is to have a reasonable life. As the pressure in the system is raised the seal needs to be made of stiffer material to resist extrusion and, eventually, a pressure is reached when the stiffness required reduces the sealing efficiency to an unacceptable level. Pressures above this will be defined as "high pressures".

Conventionally, control valves in high pressure hydraulic systems of the kind set forth have seats made of metal, or at least hard materials, which are not considered to be "elastomeric". Such systems can be made leakproof under ideal conditions. In practice, however, dirt in the fluid and manufacturing tolerances cause occasional leakage, but even this is unacceptable in suspension systems of the kind set forth.

If the control valves in a system of the kind set forth are to be operated by solenoids, the force required to operate the valves must be minimised, otherwise the current taken by the solenoids is excessive. The use of balancing pistons causes either extra seal friction or "hydraulic lock" and this prevents the total force required to operate the valves from falling below a certain minimum. The balancing of small valves is therefore considered not to be worthwhile.

According to our invention in a high pressure hydraulic system of the kind set forth the control valve assembly comprises first and second solenoid-operated valves, which are oppositely acting and arranged in series with the first valve located between the source and the second valve, and the second valve located between the first valve and the slave unit, each valve being movable into a closed position in which fluid flow through the valve in a direction from the other valve is substantially prevented, and an open position in which flow in both directions is permitted, movement of each valve between the open and closed positions being controlled by a solenoid and a pressure differential acting across the valve and each valve comprises a seating member, and a valve member for engagement with the seating member, the seating portion of one of the members of the first valve comprising an element of elastomeric material to provide a substantially leakproof seal when that valve is in the closed position.

Preferably the seating member of the first valve comprises a element of elastomeric material.

Since the first valve is substantially leakproof, that valve is operative to prevent fluid leaking back from the slave unit to the source when the second valve is open and the source is inoperative.

The second valve need not be leakproof. In fact it is preferable for the second valve to be provided with a small leakpath to reduce the pressure differential acting across the second valve and thereby reduce the magnitude of a force which is necessary to open the second valve.

Preferably the solenoids are energised in order to move the valves into the open position, but are not sufficiently powerful to open the valves against any significant pressure differential. This ensures that the elastomeric seal in the first valve cannot be destroyed by extrusion, and also reduces the force required to operate the valves. Once the valves are open, they remain open while the solenoids are energised irrespective of the direction of fluid flow. De-energisation of the solenoids tends to close the valves, but again they may not close if a significant pressure differential is acting against them.

When the valves are closed, each preferably acts as a one-way valve permitting fluid flow in a direction towards the other valve.

In operation therefore, fluid flow between the source and the slave unit is controlled by operation of the solenoids and the pressure differential between the source and the slave unit.

Preferably, the source is normally maintained at a low pressure, but when operative it is cycled slowly and continuously over a range of pressures which includes and exceeds, the range of pressures which occur in the slave unit, and the solenoids of both valves are normally de-energised.

Then if the solenoid of the second valve is energised and the source pressure cycled the second valve opens as soon as the pressure differential across it stops acting against it. Then when the source pressure exceeds the slave pressure the first valve acts as a one-way valve and fluid flows into the slave unit until either the source pressure falls below the slave pressure to cut off flow through the first valve, or the solenoid of the second valve is de-energised, to close the second valve.

If the solenoid of the first valve is energised and the source pressure cycled, the first valve opens as soon as the source pressure reaches the slave pressure and the pressure differential stops acting against the valve, and will be held open whilst the source pressure continues its cycle. When the source pressure falls below the slave pressure the second valve acts as a one-way valve and fluid will flow out of the slave unit until either the solenoid of the first valve is deenergised, to close that valve, or the source pressure exceeds the slave pressure to cut off flow through the second valve.

In one embodiment the slave unit comprises an hydraulic suspension strut. In this case pressure in the strut can be considered as a static pressure, due to the weight of the vehicle, and a dynamic pressure, due to ride movement, superimposed to produce a "ripple" at ride frequency. The static pressure will vary due to changes in the loading on the vehicle. Changes in these pressures will cause changes in ride height signals, in response to which an electronic control system manipulates the operation of the source and the control valve assembly to operate a suspension levelling system.

Such a system will operate as described above, although it should be ensured that the "ripple" in the strut pressure does not affect the opening of the second valve when the solenoid is energised, by affecting the pressure differential across the valve. The rate of pressure rise in the manifold is therefore chosen so that the "ripple" period is much less than the manifold pressure rise time, and so the correct pressure differential enabling the valve to open is achieved within one cycle of the "ripple". It is therefore almost certain that the second valve will open before the source pressure reaches the strut pressure on its first cycle.

In such a suspension system, the pressure source conveniently comprises a manifold for supplying at least two struts simultaneously, for example the suspension struts of a pair of wheels on opposite sides of a vehicle.

One embodiment of our invention and a modification are illustrated in the accompanying drawings in which.

Figure 1:
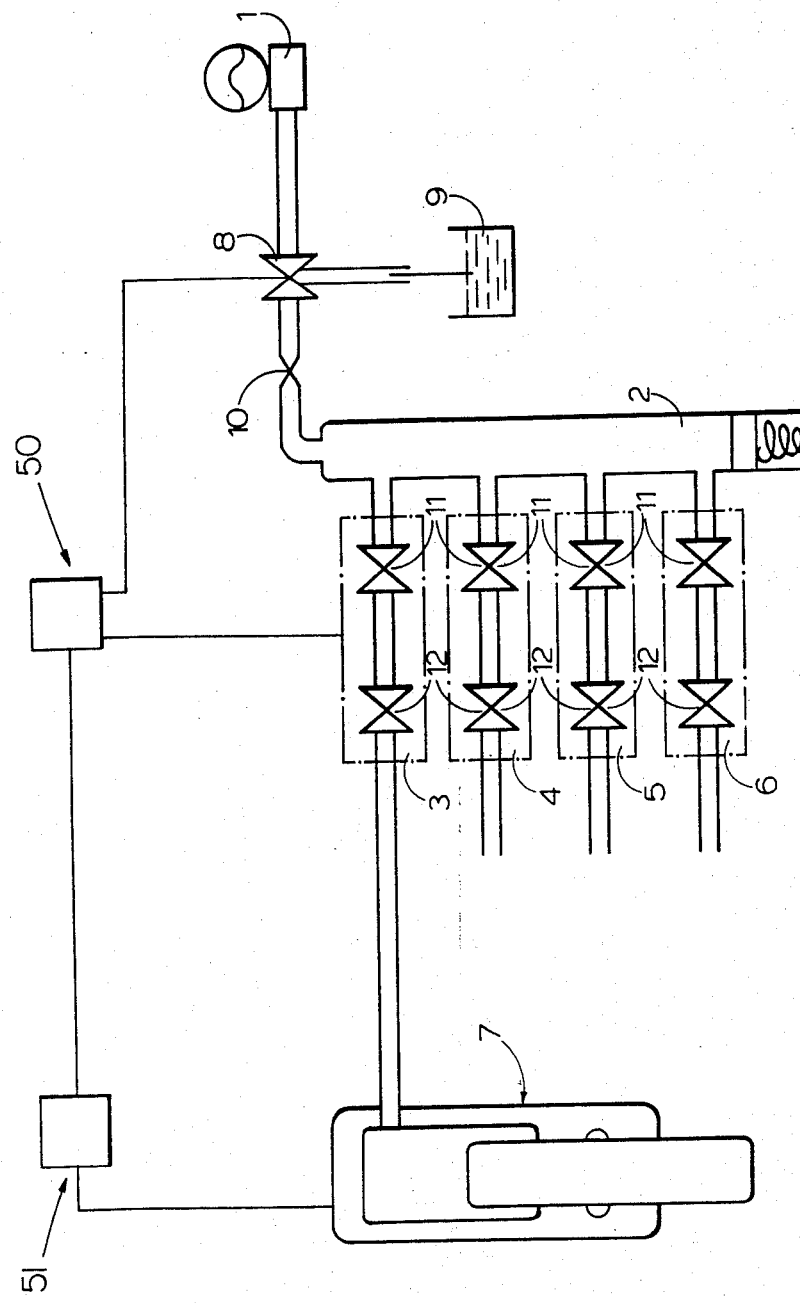
FIG. 1 is a layout of a suspension levelling system for a vehicle.

In the suspension levelling system illustrated in the layout of FIG. 1, hydraulic fluid from an hydraulic pressure source 1 is supplied from a common manifold 2 to two pairs of hydraulic suspension struts through control valve assemblies 3, 4, 5 and 6. Only one strut 7 is illustrated, and the struts of each pair are arranged to support the wheels of a pair of wheels on opposite sides of the vehicle.

A three-way valve 8 is interposed between the source 1 and the manifold 2 and the valve 8 is adapted to connect the manifold either to the source 1, or to a tank 9 at atmospheric pressure. An orifice 10 is interposed in the line between the valve 8 and the manifold 2.

Each control valve assembly 3, 4, 5 and 6 comprises a pair of solenoid-operated first and second valves 11 and 12 respectively. These are oppositely acting and arranged in series. When the solenoids are de-energised the first valves 11 are in a closed position in which fluid flow in a direction from the second valves 12 is prevented, but the first valves 11 act as one-way valves to permit flow from the manifold 2 towards the struts 7. When the solenoids are energised the valves 11 tend to open to permit flow in both directions, but will do so only when the pressure differential across them and against which they open is sufficiently low. Similarly, when the solenoids of the second valves 12 are deenergised the second valves are in a closed position in which fluid flow in a direction from the first valves 11 is substantially prevented, but the second valves 12 act as one-way valves to permit flow from the struts 7 towards the manifold 2. When energised the valves 12 tend to open to permit flow in both directions, but again will do so only when the differential across them against which they open is sufficiently low. When the valves 11 and 12 are fully open, they will remain open, irrespective of the direction of flow, until the solenoids are de-energised, when they will tend to close, but may not be able to do so against a significant pressure differential.

Figure 2:
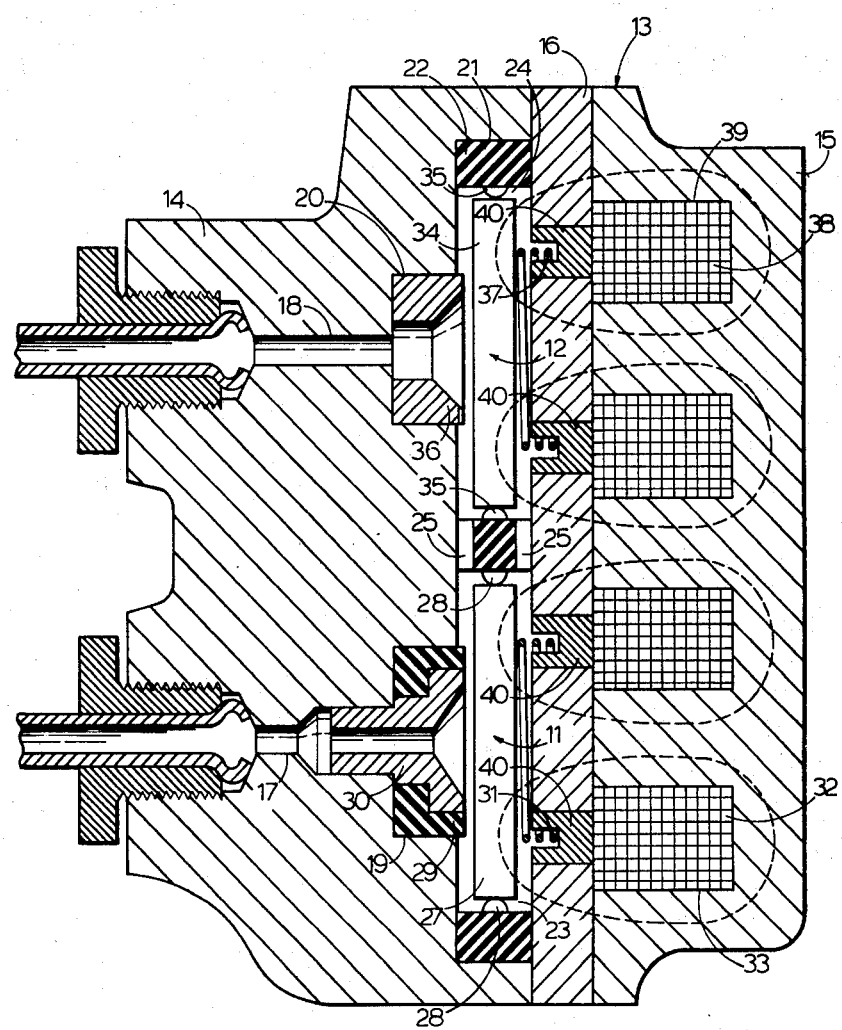
FIG. 2 is a longitudinal section through a control valve for the system of FIG. 1.
Figure 3:
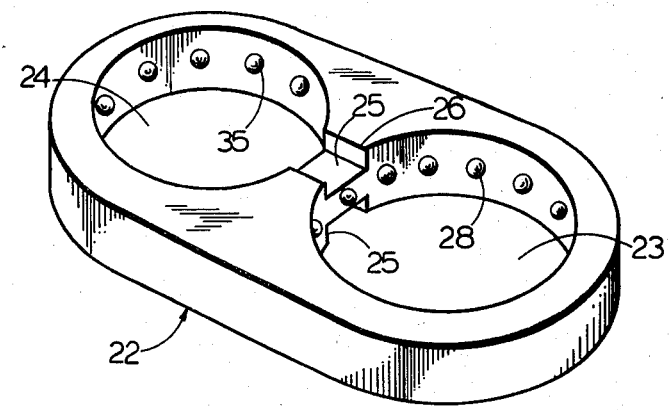
FIG. 3 is a perspective view of a seal for a valve chamber in the control valve of FIG. 2.

One of the control valves 3, 4, 5 or 6 is illustrated in FIGS. 2 and 3 of the accompanying drawings. As illustrated it comprises a housing 13 constructed from a valve body 14, a solenoid block 15, and a plate 16 which is clamped between the body 14 and the block 15.

The valve body 14 is provided with parallel bored passages 17, 18 for connection respectively, at their outer ends to the manifold 2 and to the strut 7. At their inner ends the passages 17, 18 are counterbored at 19 and 20 respectively, and both terminate in a common recess 21 of generally elliptical outline, which is disposed in the opposite end of the valve body 14 from the passages 17, 18.

A rubber seal 22 is housed within the recess 21 to form a seal between the mating faces of the valve body 14 and the plate 16 against external leakage. As illustrated in FIG. 3 the seal 22 includes two circular apertures 23 and 24 which define valve chambers and which are interconnected by passages 25 provided in opposite faces of a common web 26 disposed between the apertures.

The solenoid-operated first valve 11 comprises a valve plate 27 which is disposed within the valve chamber 23 and is located resiliently by discrete angularly spaced projections 28 on the wall of the seal 22. The valve plate 27 is engageable with an annular rubber seating lip 29 which is retained in the counterbore 19 by means of a metal insert 30. The plate 27 is normally urged towards the lip 29 by means of a light spring 31, and is moved in the opposite direction to open the valve 11 by energisation of solenoid coil 32 which is housed in an annular recess 33 in the solenoid block 15.

The solenoid-operated second valve 12 comprises a valve plate 34 which is disposed within the valve chamber 24 and is located resiliently by discrete angularly spaced projections 35 on the wall of the seal 22. The valve plate 34 is engageable with a metal seating 36 which is housed in the counterbore 20, and the seating is scratched or has an etched pattern to ensure a small leakpath as shown past the valve 12 when the valve plate 34 is in engagement with the seating 36. The plate 34 is normally urged towards the seating 36 by means of a light spring 37, and is moved in the opposite direction by energisation of a solenoid coil 38 which is housed in an annular recess 39 in the solenoid block 15.

The solenoid block 15 is made of ferromagnetic material. The plate 16, which is of composite construction, forms the pole pieces and also comprises a closure for one end of the valve chambers 23 and 24. The plate 16 is provided with inserts 40 of non-magnetic material, preferably stainless steel. The inserts 40 define the magnetic poles and are brazed into openings in the plate 16 so that fluid tightness is maintained. The valve plates 27, 34 and the remainder of the plate 16 are of ferromagnetic material and complete the magnetic paths. The construction is such that all joints crossed by the magnetic paths can easily be ground accurately flat to preserve minimum magnetic reluctance. Preferably a thin film of non-magnetic material of controlled thickness is applied to the valve plate to prevent retention of residual magnetism when the coils 32, 38 are switched off.

The valve body 14, the block 15, and the plate 16 are all clamped together by bolts (not shown) and the bolts are capable of resisting any tendency for the three components to separate when the control valve is pressurised. Excessive deflection of the plate 16 under pressure is prevented by the stiffness of the block 15 which has substantially a greater thickness. This support allows the thickness of the plate 16 to be minimised, thereby reducing the leakage flux across the non-magnetic inserts 40.

Figure 4:
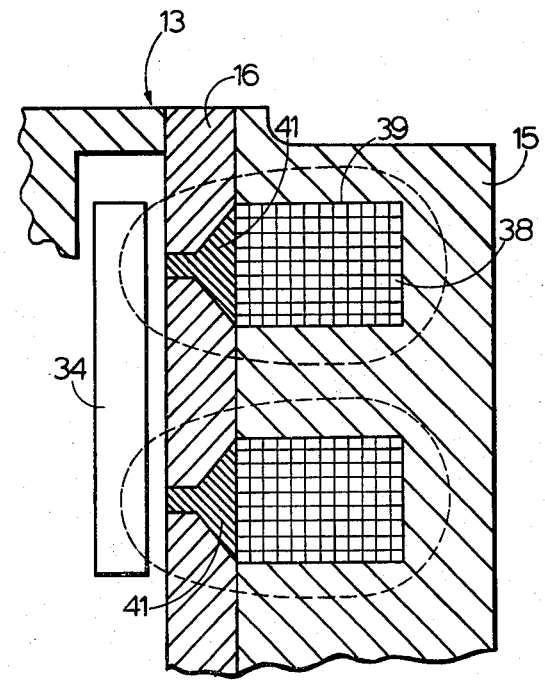
FIG. 4 is a modified solenoid-operated valve for the control valve of FIG. 2.

As illustrated in FIG. 4 flux leakage can be reduced further by providing non-magnetic inserts 41 of more complex shape.

Operation of the three-way valve 8 is such that pressure in the manifold 2, which is normally low, is cycled over a range which includes, and exceeds, the ranges of static pressure which occur in any of the struts 7. The frequency of the cycle is determined by the size of the orifice 10. This operation would cause negligible flow into any of the struts if all the solenoids 32, 38 of all the control valves assemblies 3, 4, 5 and 6 were de-energised, that is if all the valves 11, 12 were closed.

Operation of the solenoid operated valves 11, 12 is controlled by an electronic control system 50 which energises the solenoids 32, 38 to manipulate the valves in response to ride height signals from a ride height signalling system 51.

If the solenoid 38 of one of the valves 12 for example, that in control valve assembly 3 is energised in response to change in the dynamic loading on a strut, it opens as soon as the pressure differential across it stops acting against it. Normally this would happen within one cycle of the strut pressure "ripple" and this is supposed to be a small fraction of the pressure cycle in the manifold 2. It is therefore almost certain that the valve 12 will open before the pressure in the manifold 12 reaches the static pressure on its first cycle. When the manifold pressure exceeds the strut pressure, the valve 11 of the corresponding control valve will act as a one-way valve and fluid will flow into the strut 7 until either the pressure in the manifold 2 falls below that in the strut to cut off fluid flow through the valve 11, or the solenoid 38 of valve 12 is deenergised, thereby closing valve 12. Negligible fluid will flow into the other struts 7 because the valve 12 of the control valves 4, 5 and 6 will remain closed.

If the solenoid 32 of one of the valves 11, for example that in control valve assembly 3 is energised and the pressure in the manifold 2 is cycled, valve 11 will open as soon as the pressure in the manifold 2 reaches the pressure in the corresponding strut 7 and will be held open whilst the pressure in the manifold 2 continues its cycle. When the manifold pressure falls below the pressure in the strut 7 the valve 12 acts as a one-way valve, and fluid will flow out of the strut until the solenoid 32 of the valve 11 is de-energised thereby closing valve 11, or, which is less likely, until the strut pressure falls below that in the manifold 2 to cut off flow through the valve 12.

The operation described above assumes that the pressure in the manifold 2 is normally low, and cycles up and then down. It will be appreciated that operation is also possible if the pressure in the manifold 2 is normally high, and is cycled down and then up.

The leak through each valve 12 when that valve is in the closed position is necessary to prevent the maximum pressure in a corresponding strut 7 from being trapped permanently in the valve chambers. It also reduces the pressure differential across the valve, and so reduces the magnitude of the force required to open the valve.

The solenoids 32 and 38 are not powerful enough to open the valves 11 and 12 against any significant pressure difference. This means that the rubber lips 29 cannot be destroyed by extrusion when the valves 12 are closed, for example to provide leakproof seals to prevent a drop in strut pressure when the pressure source 1 is inoperative.

Two control valve assemblies such as illustrated in FIG. 2, can be combined into a common housing to control levelling of suspension struts of a pair of wheels on opposite sides of the vehicle. In such a construction the solenoid block 15 can be of sintered construction provided with recesses in which four coils are received, the recesses being interconnected by slots extending into the block for the depth of the coils in order to breakup the eddy currents.

In a modification the volume of the interconnected valve chambers 23 and 24 is made expansible to ensure that the valve 11 is able to open freely.

This can be achieved by mounting the seating 36 in the counterbore 20 in a sealing manner for limited movement against a Belleville or other spring washer. The seating 36 can then retract to increase the effective volume of the valve chamber 23 and 24 to compensate for the additional volume to be accommodated as the valve plate 27 moves accompanied by displacement of the rubber lip 29.

Alternatively the material of the seal may be arranged to deform in a region between the chambers 23 and 24 and the strut 7, but not between the strut 7 and atmosphere.

Our invention therefore provides a high pressure control system in which the control 3, 4, 5 and 6 can be sealed with elastomeric elements to guarantee substantially perfect leakproofing and yet be sufficiently durable for practical use.

In addition our invention has the advantage that only exceptionally small forces are required to operate the control valves.

I claim:

1. A high pressure hydraulic system comprising a source of hydraulic pressure, a control valve assembly and a slave unit, fluid under pressure being supplied to said slave unit from said source through said control valve assembly, said control valve assembly comprising first and second valves, respective first and second solenoids, and means for applying a pressure differential across each said valve said valves being oppositely acting and arranged in series with said first valve located between said source and said second valve, said second valve located between said first valve and said slave unit, each said valve being movable into a closed position in which fluid flow through the said valve in one direction is substantially prevented, such that one said valve prevents flow in a direction from said slave unit to said source, and the other said valve prevents flow in a direction from said source to said slave unit, and each said valve being movable into an open position in which flow in both directions is permitted, movement of each said valve between said open and said closed positions being controlled by forces produced by a first means including said respective solenoid and a second means comprising said pressure differential applying means for the said valve, the forces produced by said first means being of predetermined values that when said solenoids of said first means are energized tending to move said valves from said closed to said open position and said second means produces a force which opposes and exceeds the predetermined value produced by said first means for opening said valves, said first means are unable to move said valves to its open position, each said valve comprising a seating member and a valve member for engagement with said seating member, a seating portion of one of the said members of said valve which in said closed position prevents flow in a direction from said slave unit to said source comprising an element of elastomeric material to provide a substantially leakproof seal when said valve is in said closed position.

2. A high pressure hydraulic system comprising a source of hydraulic pressure, a control valve assembly and a slave unit, fluid under pressure being supplied to said slave unit from said source through said control valve assembly, said control valve assembly comprising first and second valves, respective first and second solenoids, and means for applying a pressure differential across each said valve, said valves being oppositely acting and arranged in series with said first valve located between said source and said second valve, and said second valve being located between said first valve and said slave unit, each said valve being movable into a closed position in which fluid flow through the said valve in a direction from the other said valve is substantially prevented, and an open position in which flow in both directions is permitted, movement of each said valve between said open and said closed positions being controlled by forces produced by a first means including said respective solenoid and a second means comprising said pressure differential applying means for the said valve, the forces produced by said first means being of predetermined values that when said solenoids of said first means are energized tending to move said valves from said closed to said open position and said second means produces a force which opposes and exceeds the predetermined value of the force produced by said first means for opening said valves said first means are unable to move said valves to its open position, each said valve comprising a seating member and a valve member for engagement with said seating member, a seating portion of one of the said members of said first valve comprising an element of elastomeric material to provide a substantially leakproof seal when said first valve is in said closed position.

3. A high pressure hydraulic system as claimed in claim 2, wherein said element of elastomeric material comprises said seating member of said first valve.

4. A high pressure hydraulic system as claimed in claim 2, wherein said second valve is provided with a small leakpath to reduce the pressure differential acting across said second valve.

5. A high pressure hydraulic system as claimed in claim 2, wherein said valves, once open, remain open while said solenoids are energised, irrespective of the direction of fluid flow.

6. A high pressure hydraulic system as claimed in claim 5, wherein when said first means produces a force to move said valves into closed positions, said force is not sufficient to close said valves if an opposing force produced by said pressure differential applied by said second means exceeds said predetermined value for closing said valves.

7. A high pressure hydraulic system as claimed in claim 2, wherein each said valve acts as a one-way valve when in said closed position, permitting fluid flow in a direction towards the other said valve.

8. A high pressure hydraulic system as claimed in claim 2, wherein said source is normally maintained at a low pressure, and when operative it is cycled slowly and continuously over a range of pressures which includes, and exceeds the range of pressures which occur in said slave unit.

9. A high pressure hydraulic system as claimed in claim 2, wherein said valves are normally in said closed positions, said solenoids are de-energised and said source is normally maintained at a low pressure and when operative it is cycled slowly and continuously over a range of pressures including and exceeding the range of pressures occuring in said slave unit, and energisation of said solenoid of said second valve and cycling of said source pressure causes said second valve to open as soon as the pressure differential across said second valve stops acting against said second valve, and when said source pressure exceeds the pressure in said slave unit said first valve, which remains in said closed position, acts as a one-way valve to cause fluid to flow into said slave unit until either said source pressure falls below said pressure in said slave unit to cut off flow through said first valve, or said solenoid of said second valve is de-energised to close said second valve.

10. A high pressure hydraulic system as claimed in claim 2, wherein said valves are normally in said closed positions, said solenoids are de-energised and said source is normally maintained at a low pressure and when operative it is cycled slowly and continuously over a range of pressures including and exceeding the range of pressures occuring in said slave unit, and energisation of said solenoid of said first valve and cycling of said source pressure causes said first valve to open when said source pressure reaches the pressure in said slave unit and the pressure differential stops acting against said first valve, said first valve being held open whilst said source pressure cycle continues, and when said source pressure falls below said pressure in said slave unit said second valve, which remains in said closed position, acts as a one-way valve to cause fluid to flow out of said slave unit until either said solenoid of said first valve is de-ednergised to close said first valve, or said source pressure exceeds said pressure in said slave unit to cut off flow through said second valve.

11. A high pressure hydraulic system as claimed in claim 2, wherein said slave unit comprises an hydraulic suspension strut.

12. A high pressure hydraulic suspension levelling system, comprising a source of hydraulic pressure, a control valve assembly, at least one hydraulic suspension strut for a wheel of a vehicle, an electronic control system and a ride height signalling system, fluid under pressure being supplied to the or each said suspension strut from said source through said control valve assembly, said electronic control system manipulating said source and said control valve assembly in response to said ride height signals, said control valve assembly comprising for each said suspension strut first and second valves, respective first and second solenoids, and means for applying a pressure differential across each said valve, said valves being oppositely acting and arranged in series with said first valve located between said source and said second valve, and said second valve located between said first valve and said suspension strut, each said valve being movable into a closed position in which fluid flow through the said valve in a direction from the other said valve is substantially prevented, and an open position in which flow in both directions is permitted, movement of each said valve between said open and said closed positions being controlled by forces produced by a first means including said respective solenoid and a second means comprising said pressure differential applying means for the said valve, the forces produced by said first means being of predetermined values that when said solenoids of said first means are energized tending to move said valves from said closed to said open position and said second means produces a force which opposes and exceeds the predetermined value produced by said first means for opening said valves said first means are unable to move said valves to its open position, each said valve comprising a seating member and a valve member for engagement with said seating member, a seating portion of one of the said members of said first valve comprising an element of elastomeric material to provide a substantially leakproof seal when said first valve is in said closed position.

13. A high pressure hydraulic suspension levelling system as claimed in claim 12, wherein said source comprises a manifold for supplying at least two said suspension struts simultaneously.

* * * * *